G. J. BRADBURY.
WHEEL.
APPLICATION FILED APR. 24, 1906.

1,006,179.

Patented Oct. 17, 1911.

2 SHEETS—SHEET 1.

Witnesses

Inventor.
George J. Bradbury
By Geo. B. Pitts, Atty.

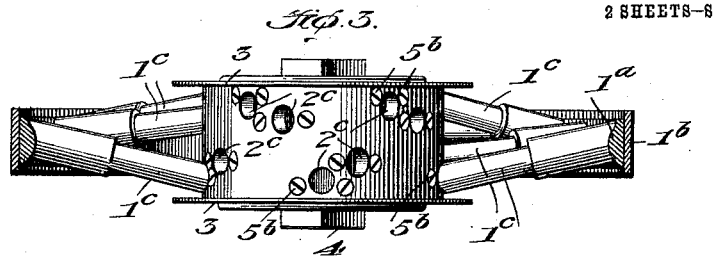
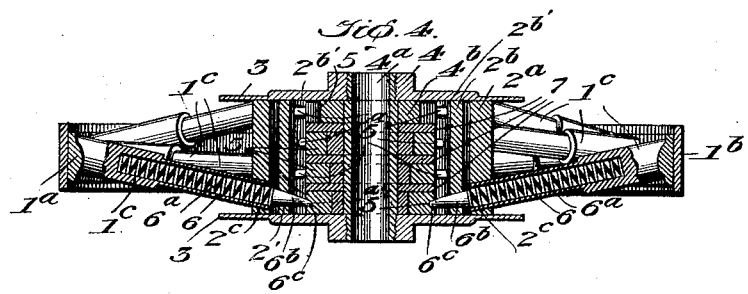
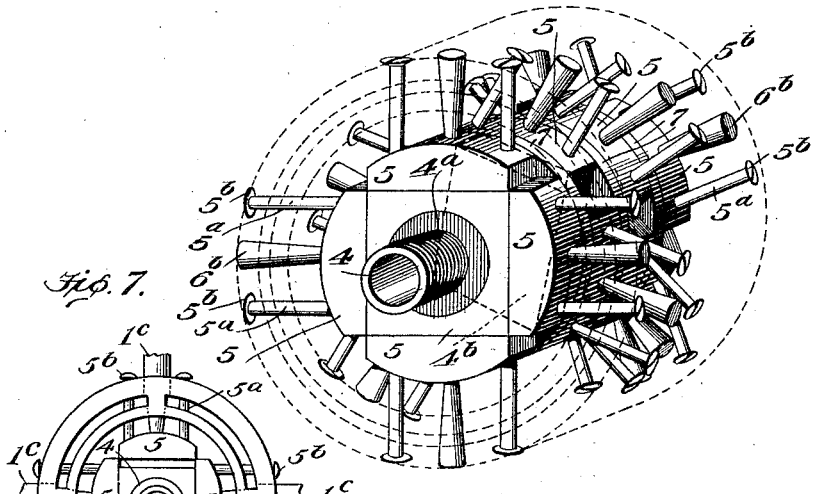
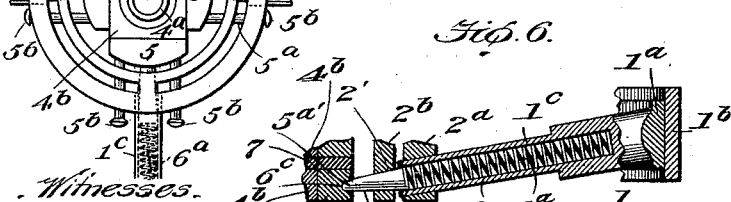

UNITED STATES PATENT OFFICE.

GEORGE J. BRADBURY, OF TWINING CITY, DISTRICT OF COLUMBIA.

WHEEL.

1,006,179.

Specification of Letters Patent.   Patented Oct. 17, 1911.

Application filed April 24, 1906.   Serial No. 313,505.

*To all whom it may concern:*

Be it known that I, GEORGE J. BRADBURY, a citizen of the United States, residing at Twining City, in the District of Columbia, have invented certain new and useful Improvements in Wheels, of which the following is a specification.

This invention relates to wheels particularly adapted for automobiles or like vehicles, but is designed to be applied in any capacity wherein the ordinary type of wheel is usually employed.

The object of my invention is to provide a cushion or yielding hub, thus enabling the employment of a solid unpuncturable tire.

Another object of my invention is to provide a cushion or yielding hub which will prevent jarring, will obviate the noise and rigidity, and relieve the strain on the various parts of the wheel.

With these objects in view and such others as may hereinafter appear, my invention consists in the particular construction of the various parts, and in the novel manner of combination and arrangement of said parts, all of which will be more fully described and specifically pointed out in the appended claims.

Figure 1:
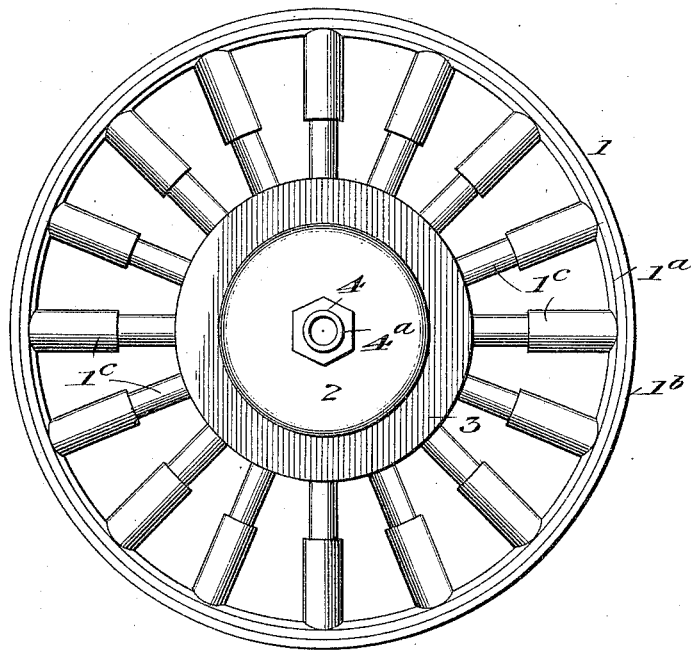
Figure 2:
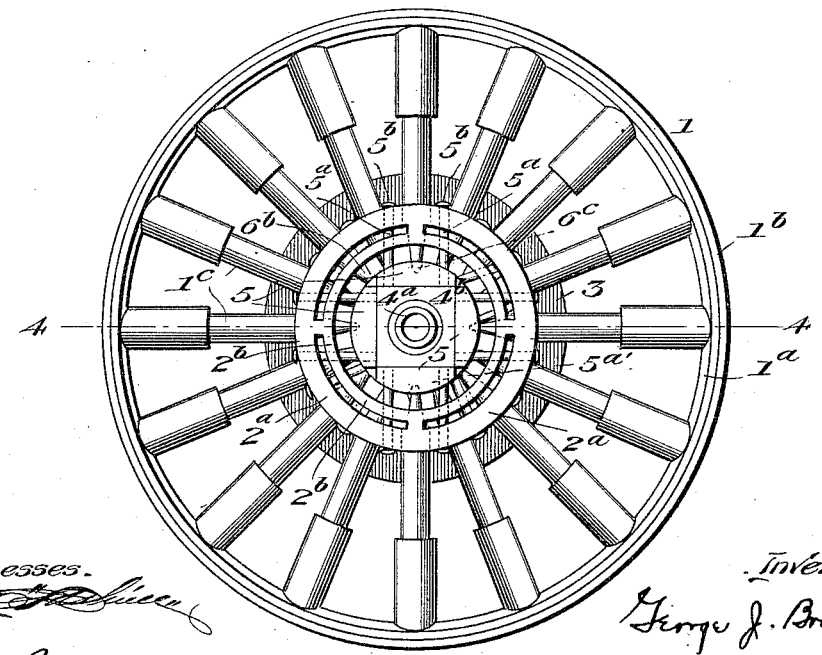

In the drawings forming a part of this specification:—Figure 1 is a side view of a wheel embodying my invention. Fig. 2 is a side view of the wheel, the near side plate of the hub casing being removed. Fig. 3 is a plan view of the wheel, the rim and tire being in section and certain of the spokes being omitted to illustrate the construction of the hub. Fig. 4 is a section through the wheel on the line 4—4 of Fig. 2. Fig. 5 is an enlarged perspective view of the wheel bearing member, the thrust members and the guides therefor, as a unit, the hub being shown by dotted lines. Fig. 6 is an enlarged fragmentary sectional view through the rim, tire and one of the spokes, showing a spring and plunger in operative position. Fig. 7 is a fragmentary view of the bearing member and certain thrust members showing their position when the wheel is under a load.

In the drawings 1 indicates a wheel structure comprising a rim $1^a$, a tire $1^b$, a hub casing 2, and a series of spokes $1^c$ connected at their opposite ends in the hub casing and rim. The construction of the wheel may be of any usual or preferred form.

The hub casing preferably comprises two annular members, $2^a$, $2^b$, one arranged within the other, and side plates 3, 3.

The numeral $2^c$ indicates openings formed in the outer annular member $2^a$, through which the spokes $1^c$ extend, the inner ends thereof being secured to the hub casing in any suitable manner. The spokes $1^c$ may be secured to the hub 2 in any suitable manner.

The numeral 4 indicates a bearing member for the axle of the vehicle normally arranged centrally of the hub 2. This bearing member comprises a sleeve $4^a$ and a series of polygonally-shaped blocks $4^b$, preferably of square shape, fixed to the sleeve $4^a$. The opposite ends of the sleeve $4^a$ extend outwardly beyond the annular members $2^a$, $2^b$, and form supports for the side plates 3. Preferably the opposite ends of the sleeve and the plates are provided with screw threads whereby the plates may be secured to bearing member 4 and also be adjusted into close sliding engagement with the circumferential edges of the annular members $2^a$, $2^b$.

The numeral 5 indicates a series of thrust members, one for each side of each block $4^b$. The bearing member engaging walls of the thrust members are flat and preferably as wide as the side walls of the blocks $4^b$ to form guide walls therefor, as will be later described.

The numerals $5^a$, $5^a$, indicate guide devices for the thrust members 5. There are preferably two guides for each thrust member arranged near the opposite sides thereof. The guide devices are preferably fixed to the thrust members and extend through one or both members $2^a$, $2^b$ of the hub 2, apertures $2^{a\prime}$, $2^{b\prime}$, being formed in the annular members $2^a$, $2^b$, respectively, to receive the guides $5^a$.

The numeral $5^b$ indicates a stop device carried by each guide device $5^a$ operating to engage with the outer surface of one of the annular members to limit the inward movement of the adjacent thrust member 5. In the preferred form of the invention the guides $5^a$ comprise bolts screwed into suitable screw-threaded openings in the thrust members and the heads of the bolts operate as the stops $5^b$ and engage with the annular member $2^a$.

The numeral 6 indicates compression means for the thrust member 5, preferably comprising coiled springs $6^a$ suitably supported by the wheel structure, and operating to force the thrust members inwardly or in engagement with the walls of the blocks 4ᵇ. Preferably the spokes 1ᶜ are of tubular form to receive the coil springs 6ᵃ.

The numeral 6ᵇ indicates a plunger which may be interposed between each spring 6ᵃ and the adjacent thrust member 5. The inner end of each plunger, indicated by the numeral 6ᶜ, fits into a socket 5ᵃ′ formed in the adjacent thrust member.

The numeral 2′ indicates openings formed in the annular member 2ᵇ through which the plunger 6ᵇ extends.

The numeral 7 indicates washers or spacers interposed between adjoining blocks 4ᵇ and adjoining sets of thrust members 5 to permit their free operation.

As shown in Fig. 5, it will be understood that the blocks 4ᵇ are so arranged, angularly relative to each other about the axis of the wheel, that at least one side wall of one of the blocks will be at substantially right angles to the line of force communicated to the bearing member. By this arrangement one of the thrust members 5 will always be in such position as to take the force directly, that is, along substantially the same line as the spring 6ᵃ of that thrust member 5 operates.

In Fig. 7 I have illustrated the position of the bearing member 4 and a thrust member 5, and its associated parts, when under a load. Here it will be seen that the force is acting directly downward, the block 4ᵇ sliding between the two side thrust members 5 and the upper thrust member 5 being held in normal position by the stop devices 5ᵇ. From Fig. 7 it will be understood that the opposing flat surfaces of the blocks 4ᵇ and thrust members 5 form bearing surfaces to permit the free sliding of one relative to the other.

As shown in Fig. 5, the thrust members 5 are arranged in different positions about the axis of the wheel and that the thrust members 5 for the walls of one block 4ᵇ overlap the thrust members 5 for the adjoining block or blocks 4ᵇ. By this arrangement it will be seen that when the bearing member 4 yields under the influence of the load carried by the wheel, or otherwise, all the thrust members 5, in addition to the one in direct line with the direction of the force, which have portions extending into the path of movement of the bearing member, will be forced radially against the tension of their respective springs 6ᵃ and in proportion to the amount or extent that their block engaging walls lie in the path of movement of the bearing member. From this it will be seen that the downward and forward movements communicated to the bearing member 4 is taken up and absorbed by several thrust members simultaneously.

The guide devices 5ᵃ for each thrust member 5 are of a length so that when all the thrust members 5 are at the limit of their inward movement, they each fit snugly against the adjacent wall of a block 4ᵇ, whereby the bearing member 4 is positioned centrally or axially of the wheel.

Having thus described the various features of my invention, what I claim as new and desire to secure by Letters Patent, is:

1. In a wheel of the class described, the combination with a hub casing, a rim and a series of spokes, of a bearing member, a series of polygonal blocks mounted on said member, the said blocks being arranged on said member relative to each other so that their side walls extend in different directions at right angles to lines radiating from the axis of the wheel, a series of thrust members arranged within said hub casing, each in engagement with the adjacent side wall of a block and movable radially independently of adjoining thrust members, a plunger for each thrust member, and a compression spring for each plunger operating to force the plunger inwardly toward the axis of the wheel.

2. In a wheel structure, the combination of a hub casing, a rim, a series of spokes between said hub casing and said rim, a bearing member provided with a series of polygonal blocks normally arranged centrally of the hub casing, the said blocks being arranged on said bearing member so that the side walls of one block extend in directions different from the directions of the side walls of the remaining blocks and at right angles to lines radiating from the axis of the wheel, a series of thrust members movable independently of each other in radial directions and each arranged to engage the adjacent side wall of a block, a series of guide devices, one for each thrust member, slidingly mounted in apertures formed in the hub casing for supporting and guiding the thrust members, and springs arranged to force the thrust members inwardly.

3. In a wheel structure, the combination of a rim, a hub casing, a series of hollow spokes connected at their opposite ends with said rim and hub casing, a bearing member normally arranged centrally of the hub casing and provided with a series of polygonal blocks arranged relative to each other so that each side wall thereof lies in a plane at right angles to one of said spokes, a series of thrust members, one for each side wall of each of said blocks, arranged normally in sliding engagement therewith and movable radially independently of each other, compression springs, one arranged in each of said spokes, for maintaining the thrust members in engagement with said blocks, and two guides for each of said thrust members, one arranged on either side of the adjacent spring, mounted in apertures formed in the hub casing, for supporting and guiding the adjacent thrust member.

4. In a wheel structure, the combination of a rim, a hub casing, a series of hollow spokes connected at their opposite ends to said rim and hub casing, a bearing member provided with a series of polygonal blocks arranged relative to each other so that each side wall thereof lies in a plane at right angles to one of said spokes, a series of compression springs, one arranged in each of said spokes, a series of thrust members each arranged between one of said springs and the adjacent side wall of a block and coöperating with the remaining thrust members to maintain the bearing member centrally of the hub casing, and means for limiting the inward movement of said thrust members.

5. The combination with a rim, and a tire, of a hub casing comprising a plurality of annular members, arranged one within the other, spokes connected at their opposite ends to said rim and hub casing, a bearing member provided with a series of polygonal blocks, a series of thrust members arranged within said hub casing, each having sliding engagement with the adjacent side wall of a block and movable radially, guides for each thrust member slidably connected with the hub casing, springs operatively connected with the thrust members for maintaining them in engagement with the said blocks, and side plates secured to the bearing member and having sliding engagement with the opposite circumferential side edges of the annular members.

GEORGE J. BRADBURY.

Witnesses:
John E. Taylor,
Owen H. Fowler.

Copies of this patent may be obtained for five cents each, by addressing the "Commissioner of Patents, Washington, D. C."